US009641789B2

(12) United States Patent
Cho et al.

(10) Patent No.: US 9,641,789 B2
(45) Date of Patent: May 2, 2017

(54) SURVEILLANCE CAMERA AND DIGITAL VIDEO RECORDER

(71) Applicant: HANWHA TECHWIN CO.,LTD., Changwon-si (KR)

(72) Inventors: Sung Bong Cho, Changwon-si (KR); Jong Ryul Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 103 days.

(21) Appl. No.: 14/262,929

(22) Filed: Apr. 28, 2014

(65) Prior Publication Data

US 2015/0201152 A1   Jul. 16, 2015

(30) Foreign Application Priority Data

Jan. 16, 2014 (KR) .................. 10-2014-0005604

(51) Int. Cl.
   *H04N 5/77*   (2006.01)
   *G06K 9/32*   (2006.01)
   *H04N 1/21*   (2006.01)
   *H04N 9/804*  (2006.01)
   *H04N 101/00* (2006.01)

(52) U.S. Cl.
   CPC ............ *H04N 5/77* (2013.01); *G06K 9/3241* (2013.01); *H04N 1/2112* (2013.01); *H04N 9/8042* (2013.01); *H04N 2101/00* (2013.01)

(58) Field of Classification Search
   CPC ............ H04N 19/137–19/139; H04N 19/117
   See application file for complete search history.

(56) References Cited

U.S. PATENT DOCUMENTS

| 6,909,745 B1* | 6/2005 | Puri ................. H04N 19/70 348/384.1 |
| 2009/0154565 A1 | 6/2009 | Jeong et al. |
| 2009/0202169 A1* | 8/2009 | Hayashi ............. G06T 3/4092 382/264 |
| 2010/0119157 A1* | 5/2010 | Kameyama ......... H04N 19/115 382/195 |
| 2012/0207218 A1* | 8/2012 | Asamura et al. ........ 375/240.16 |

FOREIGN PATENT DOCUMENTS

| JP | 2008-048243 A | 2/2008 |
| KR | 10-2005-0099830 A | 10/2005 |
| KR | 10-2009-0062049 A | 6/2009 |

* cited by examiner

*Primary Examiner* — Siamak Harandi
*Assistant Examiner* — Raphael Schwartz
(74) *Attorney, Agent, or Firm* — Sughrue Mion, PLLC

(57) ABSTRACT

Disclosed is a surveillance apparatus such as a surveillance camera and a digital video recorder. The surveillance apparatus includes: an analog-to-digital converter configured to convert an analog video signal, of at least one image of a region captured by an optical system, into digital video data of the region; and a main controller configured to detect a current motion region from the digital video data of the region, remove a high frequency component of the region except the current motion region, and transmit the digital video data of the region, from which the high frequency component is removed, to a target device over a communication network.

20 Claims, 13 Drawing Sheets

SURVEILLANCE CAMERA AND DIGITAL VIDEO RECORDER

CROSS-REFERENCE TO RELATED APPLICATION

This application claims priority from Korean Patent Application No. 10-2014-0005604, filed on Jan. 16, 2014, in the Korean Intellectual Property Office, the disclosure of which is incorporated herein in its entirety by reference.

BACKGROUND

1. Field

Apparatuses and methods consistent with exemplary embodiments relate to a surveillance camera and a digital video recorder, which are used in a surveillance system.

2. Description of the Related Art

With the advance of technology of an image sensor of an optical-to-electrical device (for example, a charge coupled device (CCD) or a complementary metal oxide semiconductor (CMOS)) applied to cameras, the cameras may generate high-resolution live view video data.

However, regarding a state of a communication network or performances of client terminals, it is not easy to transmit high-resolution live view video data to the client terminals over the communication network.

Therefore, in the case of a surveillance camera that transmits digital video data to client terminals or a network video recorder over the communication network, the digital video data is compressed at a high compression rate by a surveillance camera so as to reduce the amount of transmitted data.

Moreover, in the case of a digital video recorder that receives analog video data from surveillance cameras, the analog video data is converted into digital video data by the digital video recorder, the digital video data is compressed at a high compression rate so as to reduce the amount of transmitted and stored data, and the compressed digital video data is transmitted to client terminals over a communication network.

In surveillance cameras or digital video recorders of the related art, when a bandwidth of the communication network is narrow, digital video data compressed at a high compression rate is transmitted, and thus, unclear videos are displayed at client terminals. For this reason, the surveillance effects of the client terminals are reduced.

SUMMARY

One or more exemplary embodiments provide a surveillance apparatus such as a surveillance camera and a digital video recorder, which transmits video data, which is effective for a user, to a target device despite a large amount of data to be transmitted.

Various aspects of the exemplary embodiments will be set forth in part in the description which follows and, in part, will be apparent from the description, or may be learned by practice of these embodiments.

According to an aspect of an exemplary embodiment, there is provided a surveillance apparatus which may include an analog-to-digital converter configured to convert an analog video signal, of at least one image of a region captured by an optical system, into digital video data of the region; and a main controller configured to detect a current motion region from the digital video data of the region, remove a high frequency component of the region except the current motion region, and transmit the digital video data of the region, from which the high frequency component is removed, to a target device over a communication network.

A high frequency component of an image may be removed by applying low pass filtering on the image. Here, if the main controller does not detect the current motion region from the digital video data of the region, the main controller may perform low pass filtering on the digital video data of the region except the current motion region to remove the high frequency component of the region except the current motion region.

The main controller may be further configured to detect a predetermined target in the region. If the current motion region is detected from the digital video data of the region, and the predetermined target is detected from the current motion region, the main controller may perform low pass filtering on the digital video data of the region except the current motion region, to remove the high frequency component of the region except the current motion region.

However, even when the current motion region is detected from the digital video data of the region, if the predetermined target is not detected from the current motion region, the main controller may perform low pass filtering on the digital video data of the region, that is, the entire digital video data, to remove a high frequency component of the digital video data of the region.

According an aspect of another exemplary embodiment, there is provided a method of processing video data which may include: converting an analog video signal, of at least one image of a region captured by an optical system, into digital video data of the region; detecting a current motion region from the digital video data of the region; removing a high frequency component of the region except the current motion region if the current motion region is detected; and transmitting the digital video data, from which the high frequency component is removed, to a target device over a communication network.

The method may further include compressing the digital video data of the region.

Specifically, the method may further include compressing the digital video data on which the low pass filtering is performed without compressing the digital video data on which the low pass filtering is not performed, if the current motion region is detected from the digital video data of the region.

According to an aspect of still another exemplary embodiment, there is provided a computer recording medium having recorded thereon a program for executing the above method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
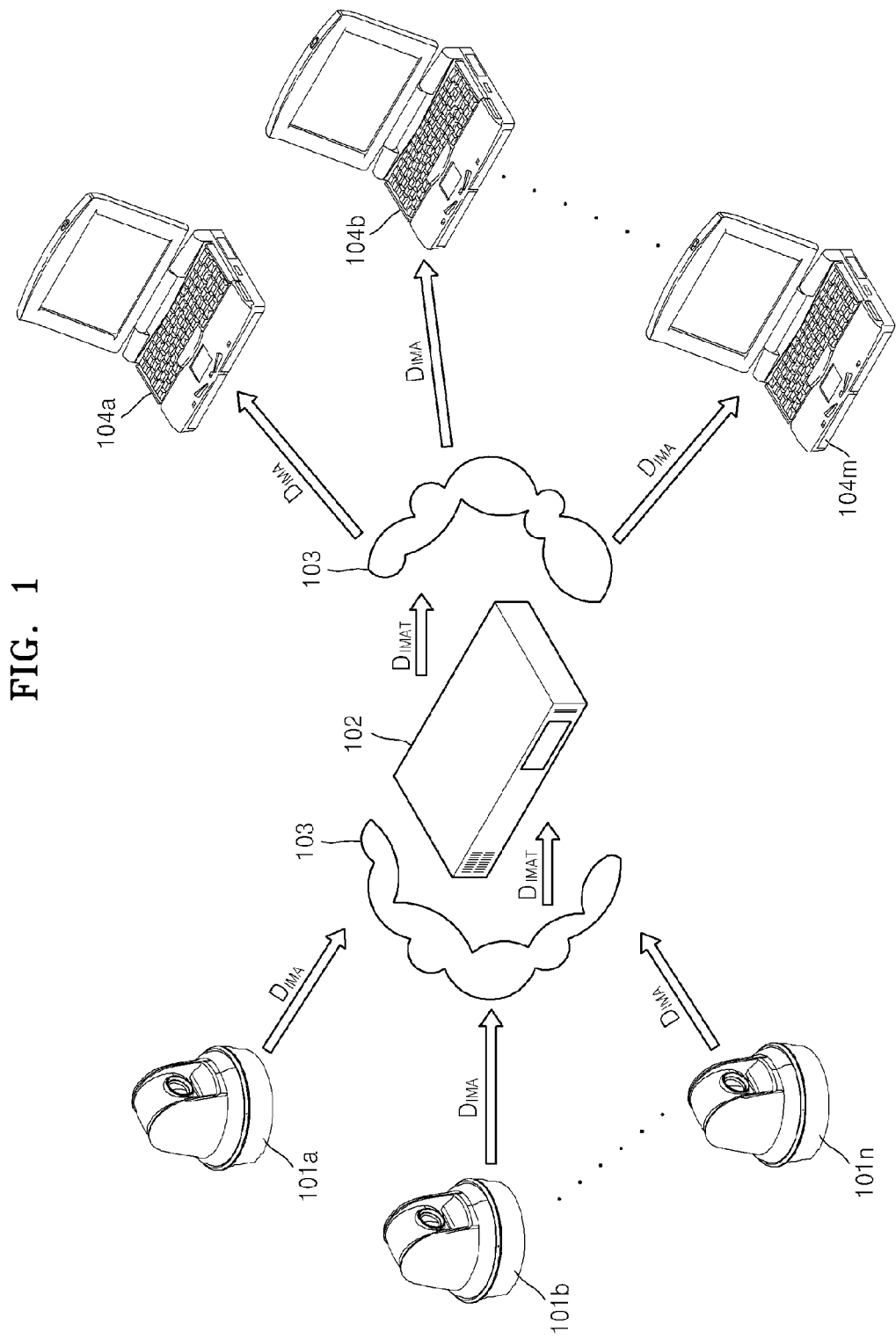
FIG. 1 is a diagram illustrating a surveillance system including surveillance cameras according to an exemplary embodiment.

Reference will now be made in detail to exemplary embodiments which are illustrated in the accompanying drawings, wherein like reference numerals refer to like elements throughout. In this regard, these embodiments may have different forms and should not be construed as being limited to the descriptions set forth herein. Accordingly, the embodiments are merely described below, by referring to the figures, to explain aspects of the inventive concept. Expressions such as "at least one of," when preceding a list of elements, modify the entire list of elements and do not modify the individual elements of the list.

Moreover, the present specification and the drawings are not provided for the purpose of limiting the inventive concept, and the spirit and scope of the inventive concept should be defined by claims. The terms or words used in the present specification and claims should be interpreted based on the meanings and concepts corresponding to technical aspects of the inventive concept.

Hereinafter, the exemplary embodiments of the inventive concept will be described in detail with reference to the accompanying drawings. In addition, in the present specification and drawings, like reference numerals refer to like elements throughout, and thus, redundant descriptions are omitted.

FIG. 1 is a diagram illustrating a surveillance system including a plurality of surveillance cameras 101a to 101n according to an exemplary embodiment.

In FIG. 1, reference numeral $D_{IMA}$ refers to digital video data which is transmitted from each of the surveillance cameras 101a to 101n to a communication network 103 (for example, the Internet), or transmitted from the communication network 103 to a plurality of client terminals 104a to 104m.

Reference numeral $D_{IMAT}$ refers to digital video data which is transmitted from the communication network 103 to a network video recorder (NVR) 102, or transmitted from the NVR 102 to the communication network 103.

Referring to FIG. 1, the NVR 102 is connected to the surveillance cameras 101a to 101n and the client terminals 104a to 104m over the communication network 103, for example, the Internet.

Each of the surveillance cameras 101a to 101n obtains the digital video data $D_{IMA}$, and transmits the obtained digital video data $D_{IMA}$ to at least one target device over the communication network 103.

In the surveillance system of FIG. 1, a target device for the surveillance cameras 101a to 101n according to the present embodiment is the NVR 102. However, the surveillance cameras 101a to 101n may directly transmit digital video data to the client terminals 104a to 104m over the communication network 103. That is, the target device for the surveillance cameras 101a to 101n according to the present embodiment may be each of the client terminals 104a to 104m.

The NVR 102 loads and stores packets (which are received by channel) in a volatile memory, and transmits the packets. That is, the NVR 102 transmits video data, which are loaded by channel in the volatile memory, to the client terminals 104a to 104m, and stores the video data in a recording medium.

The surveillance cameras 101a to 101n according to the present embodiment will be described in detail with reference to FIGS. 2 to 8.

Figure 2:
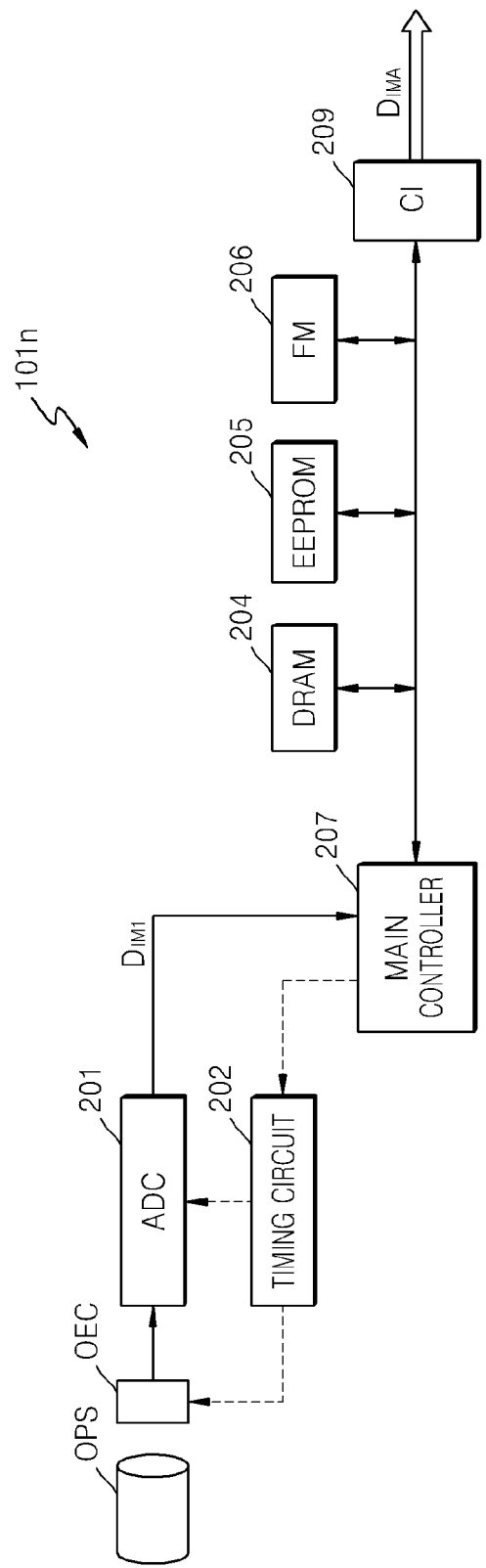
FIG. 2 is a diagram illustrating an internal configuration of one of the surveillance cameras of FIG. 1, according to an exemplary embodiment.

FIG. 2 is a diagram illustrating an internal configuration of the surveillance camera 101n of FIG. 1.

An internal configuration and operation of the surveillance camera 101n according to the present embodiment will now be described in detail with reference to FIGS. 1 and 2.

The surveillance camera 101n according to the present embodiment includes an optical system (OPS), an optical-to-electrical converter (OEC), an analog-to-digital converter (ADC) 201, a timing circuit 202, a dynamic random access memory (DRAM) 204, an electrically erasable and programmable read only memory (EEPROM) 205, a flash memory (FM) 206, a main controller 207, and a communication interface 209.

The OPS includes a lens unit and a filter unit, and optically processes light from a subject.

The OEC of a CCD or a CMOS converts light, transferred from the OPS, into an electrical analog signal. Here, the main controller 207 controls the timing circuit 202 to thereby control operations of the OEC and the ADC 201.

The ADC 201 processes an analog video signal from the OEC to remove high frequency noise and adjust an amplitude, and then converts the analog video signal into digital video data $D_{IM1}$. The digital video data $D_{IM1}$ is input to the main controller 207.

The timing circuit 202 controls the operations of the OEC and the ADC 201 according to a synchronization signal from the main controller 207.

The DRAM 204 temporarily stores digital video data from the main controller 207. The EEPROM 205 stores a program that is necessary for an operation of the main controller 207. The flash memory 206 stores preset or predetermined data that is necessary for an operation of the main controller 207.

The main controller 207 communicates with the NVR 102 (which is a target device) over the communication interface 209, and transmits the digital video data $D_{IMA}$ to the NVR 102.

Here, the main controller 207 detects a current motion region from the digital video data $D_{IM1}$ transferred from the ADC 201, removes a high frequency component of a region except the detected current motion region, and transmits the digital video data $D_{IMA}$ (which corresponds to the removal result) to the NVR 102 (which is the target device) through the communication interface 209 and the communication network 103. In the present embodiment, the main controller 207 performs a low pass filtering operation on video data of the region except the current motion region.

Therefore, the high frequency component of the region except the current motion region is removed by the low pass filtering operation, and thus, the amount of data is reduced in a region unnecessary for surveillance. Accordingly, despite a large amount of data to be transmitted, video data effective for a user is transmitted to a target device.

For example, when digital video data obtained by removing a high frequency component of the region except the current motion region is additionally compressed and transmitted, the relatively reduced amount of data is compressed, and thus, even when video data is compressed at a relatively low compression rate, the amount of compressed data may not relatively increase. Also, since a relatively low compression rate is applied, a current motion region necessary for surveillance becomes clearer.

Figure 3:
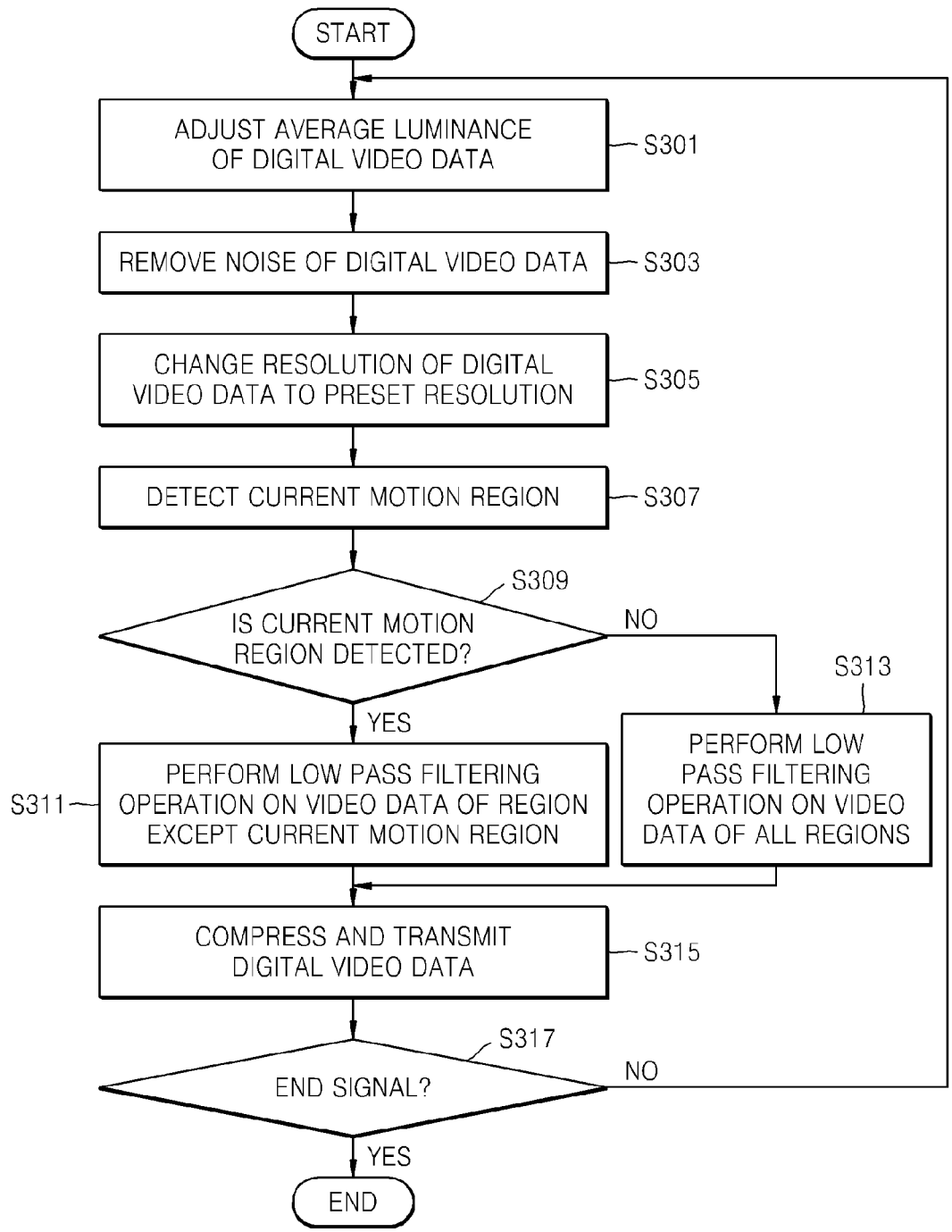
FIG. 3 is a flowchart illustrating an operation of a main controller of FIG. 2, according to an exemplary embodiment.
Figure 4:
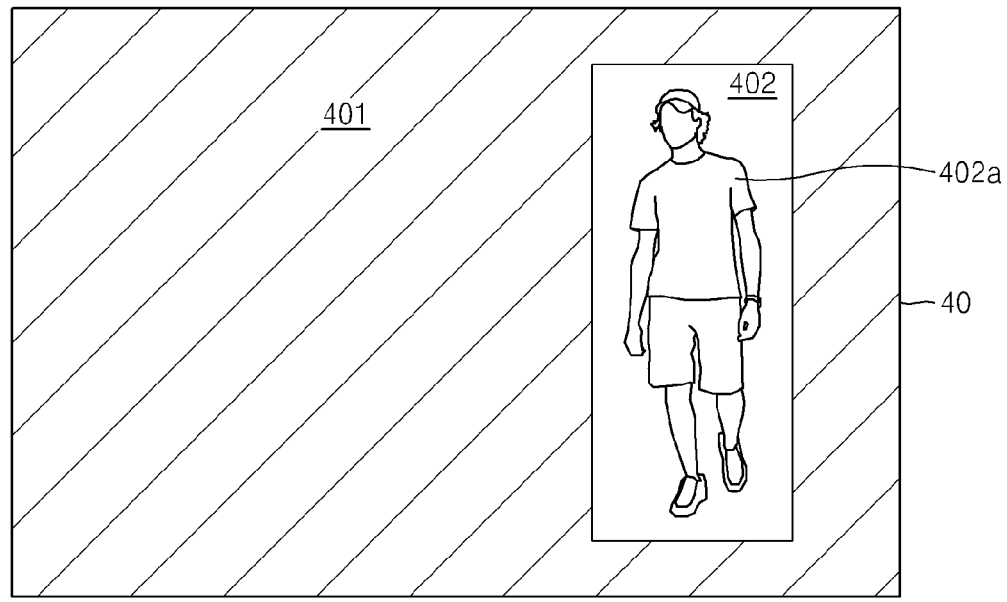
FIG. 4 is a diagram illustrating a video frame from which a motion region is detected, according to an exemplary embodiment.
Figure 5:
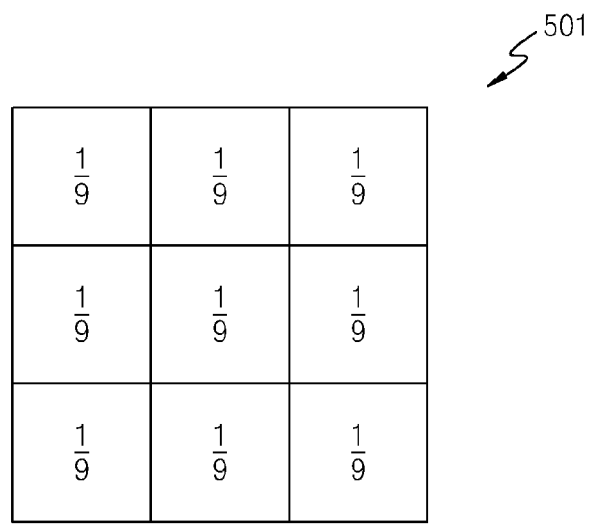
FIG. 5 is a diagram illustrating an example of a 3×3 mask of a low pass filter which is to be used for a region except a current motion region, according to an exemplary embodiment.

FIG. 3 illustrates an operation of the main controller 207 of FIG. 2, according to an exemplary embodiment. FIG. 4 illustrates a video frame 40 from which a motion region is detected, according to an exemplary embodiment. In FIG. 4, reference numeral 402a refers to a motion target. FIG. 5 is a diagram illustrating an example of a 3×3 mask 501 of a low pass filter which is to be used for a region 401 except a current motion region 402 of FIG. 4.

The first example of the operation of the main controller 207 will now be described with reference to FIGS. 2 to 5.

In operation S301, the main controller 207 adjusts an average luminance of the digital video data $D_{IM1}$ from the ADC 201.

In operation S303, the main controller 207 removes noise of the digital video data.

In operation S305, the main controller 207 changes a resolution of the digital video data to a preset resolution.

In operation S307, the main controller 207 detects a current motion region from the digital video data. The current motion region may be a region which shows a motion having at least a threshold value.

If the current motion region 402 is detected in operation S309, the main controller 207 performs a low pass filtering operation on video data of the region 401 except the current motion region 402 to remove a high frequency component from this video data, in operation S311.

In the present embodiment, the low pass filtering operation denotes an operation in which pixel values of the video data of the region 401 except the current motion region 402 are multiplied by a filter coefficient that is greater than a decimal number 0 and less than a decimal number 1. For example, the 3×3 mask 501 having a filter coefficient of ⅑ is used, and thus, the pixel values of the video data of the region 401 except the current motion region 402 are reduced by ⅑ times.

Here, the filter coefficient increases in proportion to the number of previously-occurred motions in the region 401 except the current motion region 402. For example, when the number of previously-occurred motions in the region 401 except the current motion region 402 is 14, the filter coefficient is ⅕, and when the number of previously-occurred motions in the region 401 except the current motion region 402 is 7, the filter coefficient is ⅛. Therefore, sharpness or resolution may be determined in proportion to an importance of the region 401 except the current motion region 402.

When the current motion region 402 is not detected in operation S309, the main controller 207 performs the low pass filtering operation on video data of all the regions 401 and 402 to remove the high frequency component therefrom, in operation S313.

Subsequently, the main controller 207 compresses digital video data, and transmits video data, corresponding to the compression result, to the NVR 102 (see FIG. 1) which is a target device, in operation S315. However, depending on the case, the digital video data may be transmitted without being compressed.

Operations S301 to S315 are periodically repeated until an end signal is generated in operation S317.

Figure 6:
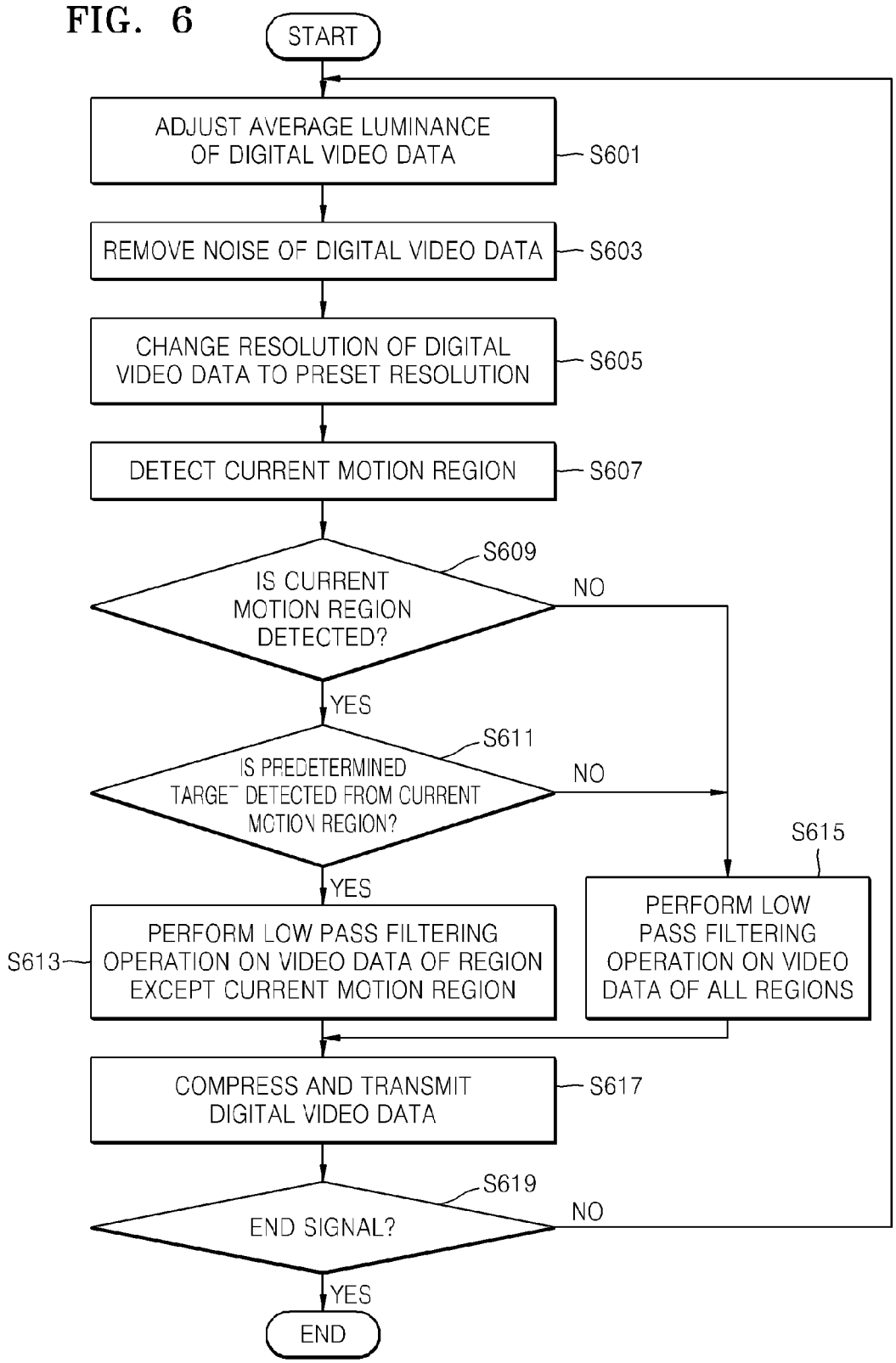
FIG. 6 is a flowchart illustrating an operation of the main controller of FIG. 2, according to an exemplary embodiment.

FIG. 6 illustrates an operation of the main controller 207 of FIG. 2, according to another exemplary embodiment. This operation of the main controller 207 will now be described with reference to FIGS. 2 and 4 to 6.

In operation S601, the main controller 207 adjusts the average luminance of the digital video data $D_{IM1}$ from the ADC 201.

In operation S603, the main controller 207 removes noise of the digital video data.

In operation S605, the main controller 207 changes the resolution of the digital video data to the preset resolution.

In operation S607, the main controller 207 detects a current motion region from the digital video data.

If the current motion region 402 is not detected in operation S609, the main controller 207 performs the low pass filtering operation on video data of all the regions 401 and 402 to remove the high frequency component therefrom in operation S615.

If the current motion region 402 is detected in operation S609, the main controller 207 determines whether a predetermined target 402a is detected from the current motion region 402, in operation S611.

Here, kinds of the predetermined target 402a are various depending on the surveillance purpose of the surveillance system. That is, regarding the advance of motion detection technology including object classification technology, the predetermined target 402a may be a person, an animal, or a vehicle which moves in a specific manner, may be a person or an animal which has a specific shape and color, or may be a specific object.

However, periodically-moving objects (for example, a tree shaken by wind, a rotating electric fan, an ascending/descending elevator, etc.) may be set as a non-moving target.

If the predetermined target 402a is not detected in operation S611, the main controller 207 performs the low pass filtering operation on the video data of all the regions 401 and 402 to remove the high frequency component therefrom, in operation S615.

If the predetermined target 402a is detected in operation S611, the main controller 207 performs the low pass filtering operation on the video data of the region 401 except the current motion region 402 to remove the high frequency component in operation S613.

Subsequently, the main controller 207 compresses digital video data, and transmits video data, corresponding to the compression result, to the NVR 102 (see FIG. 1) which is a target device, in operation S617. However, depending on the case, the digital video data may be transmitted without being compressed.

Operations S601 to S617 are periodically repeated until the end signal is generated in operation S619.

According to an exemplary embodiment, the main controller 207 may first determine the predetermined target 402a is detected in the region 401, and then, determine whether the predetermined target 402a generates a motion which satisfies a predetermined condition. Depending on a result of these determinations, the main controller 207 may select where in the region 401 the low pass filtering operation is to be performed.

Figure 7:
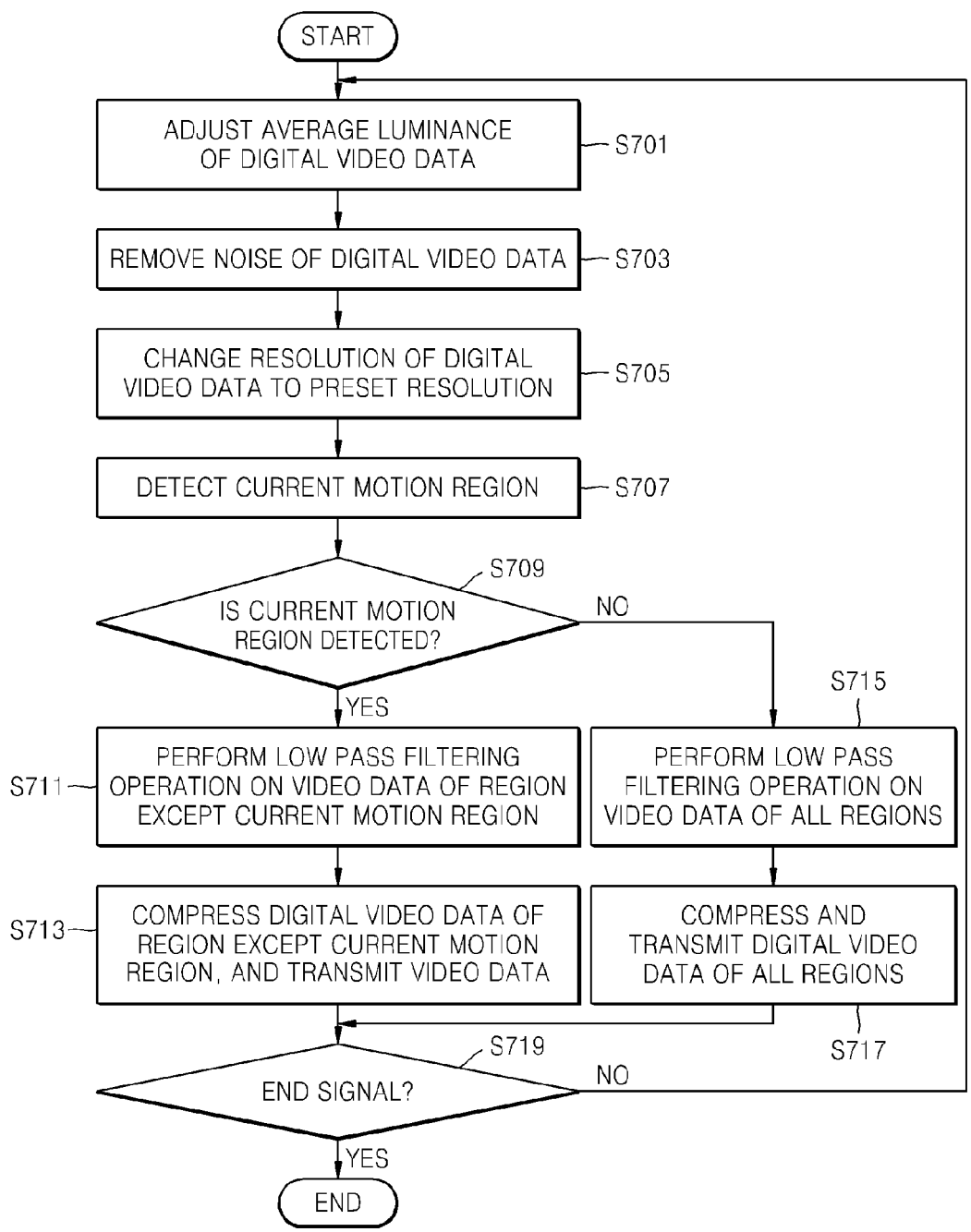
FIG. 7 is a flowchart illustrating an operation of the main controller of FIG. 2, according to an exemplary embodiment.

FIG. 7 illustrates an operation of the main controller 207 of FIG. 2, according to still another exemplary embodiment. This operation of the main controller 207 will now be described with reference to FIGS. 2, 4, 5 and 7.

In operation S701, the main controller 207 adjusts the average luminance of the digital video data $D_{IM1}$ from the ADC 201.

In operation S703, the main controller 207 removes noise of the digital video data.

In operation S705, the main controller 207 changes the resolution of the digital video data to the preset resolution.

In operation S707, the main controller 207 detects a current motion region from the digital video data.

If the current motion region 402 is detected in operation S709, the main controller 207 performs the low pass filtering operation on the video data of the region 401 except the current motion region 402, in operation S711. Also, the main controller 207 compresses the video data of the region 401 except the current motion region 402, and transmits video data, corresponding to the compression result, to the NVR 102 (see FIG. 1) which is a target device, in operation S713.

If the current motion region 402 is not detected in operation S709, the main controller 207 performs the low pass filtering operation on the video data of all the regions 401 and 402 to remove the high frequency component therefrom, in operation S715. Also, the main controller 207 compresses the digital video data of all the regions 401 and 402, and transmits video data, corresponding to the compression result, to the NVR 102 (see FIG. 1) which is a target device, in operation S717.

Operations S701 to S717 are periodically repeated until the end signal is generated in operation S317.

Figure 8:
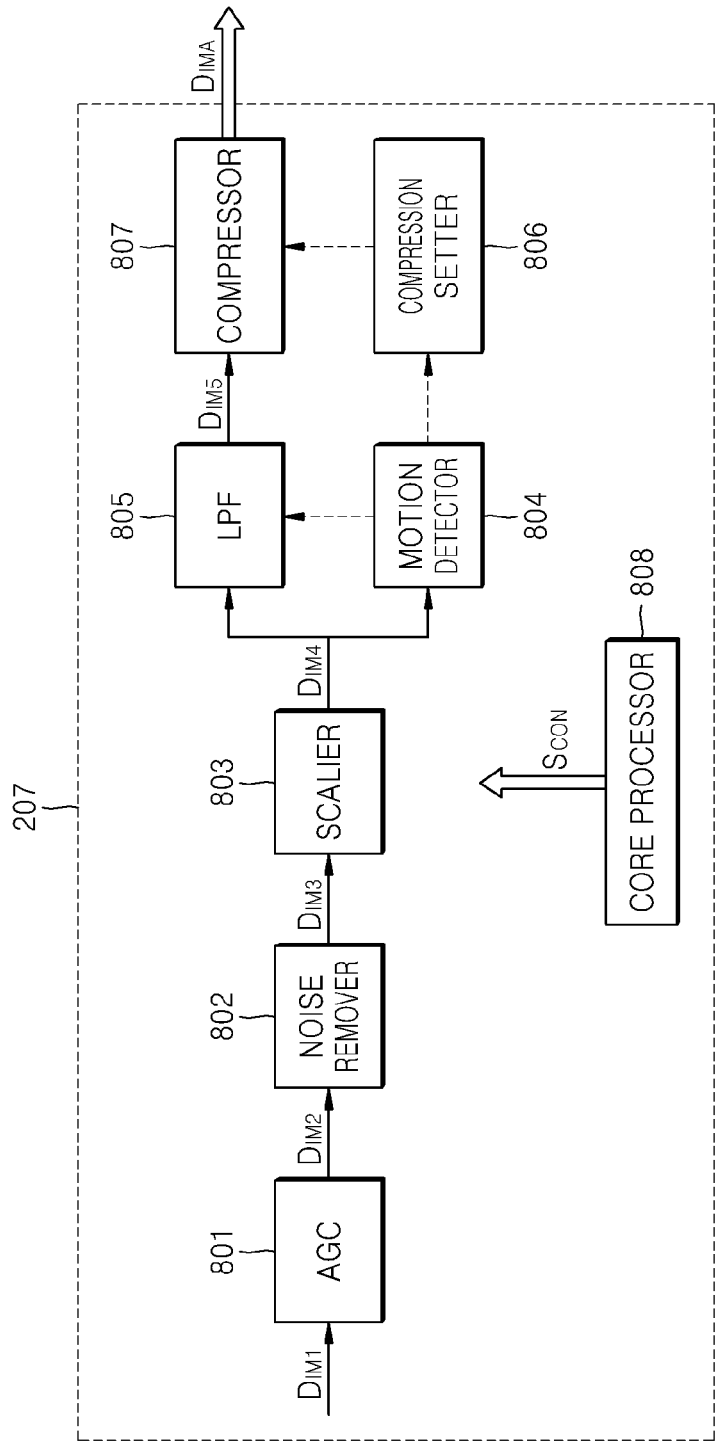
FIG. 8 is a block diagram illustrating an example of an internal configuration of the main controller of FIG. 2, according to an exemplary embodiment.

FIG. 8 illustrates an internal configuration of the main controller 207 of FIG. 2, according to an exemplary embodiment. The internal configuration of the main controller 207 will now be described in detail with reference to FIGS. 2 and 8.

The main controller 207 includes an auto gain controller (AGC) 801, a noise remover 802, a scalier 803, a motion detector 804, a low pass filter (LPF) 805, a compression setter 806, a compressor 807, and a core processor 808.

The AGC 801 adjusts the average luminance of the digital video data $D_{IM1}$ from the ADC 201.

The noise remover 802 removes noise of the digital video data $D_{IM2}$ output from the AGC 801.

The scalier 803 changes a resolution of digital video data $D_{IM3}$, output from the noise remover 802, to the preset resolution.

The motion detector 804 detects a current motion region from digital video data $D_{IM4}$ output from the scalier 803.

The LPF 805 filters out the high frequency component of a region except a current motion region in the digital video data $D_{IM4}$ output from the scalier 803, according to information about the current motion region received from the motion detector 804.

The compression setter 806 generates information about a compression exclusion region 806 according to the information about the current motion region from the motion detector 804.

The compressor 807 compresses a region except the compression exclusion region 806 in digital video data $D_{IM5}$ output from the LPF 805, according to information about the compression exclusion region 806 from the compression setter 806, and outputs the digital video data $D_{IM4}$, corresponding to the compression result, to a communication interface (CI) 209.

The core processor 808 controls operations of the AGC 801, the noise remover 802, the scalier 803, the motion detector 804, the LPF 805, the compression setter 806, and the compressor 807.

Figure 9:
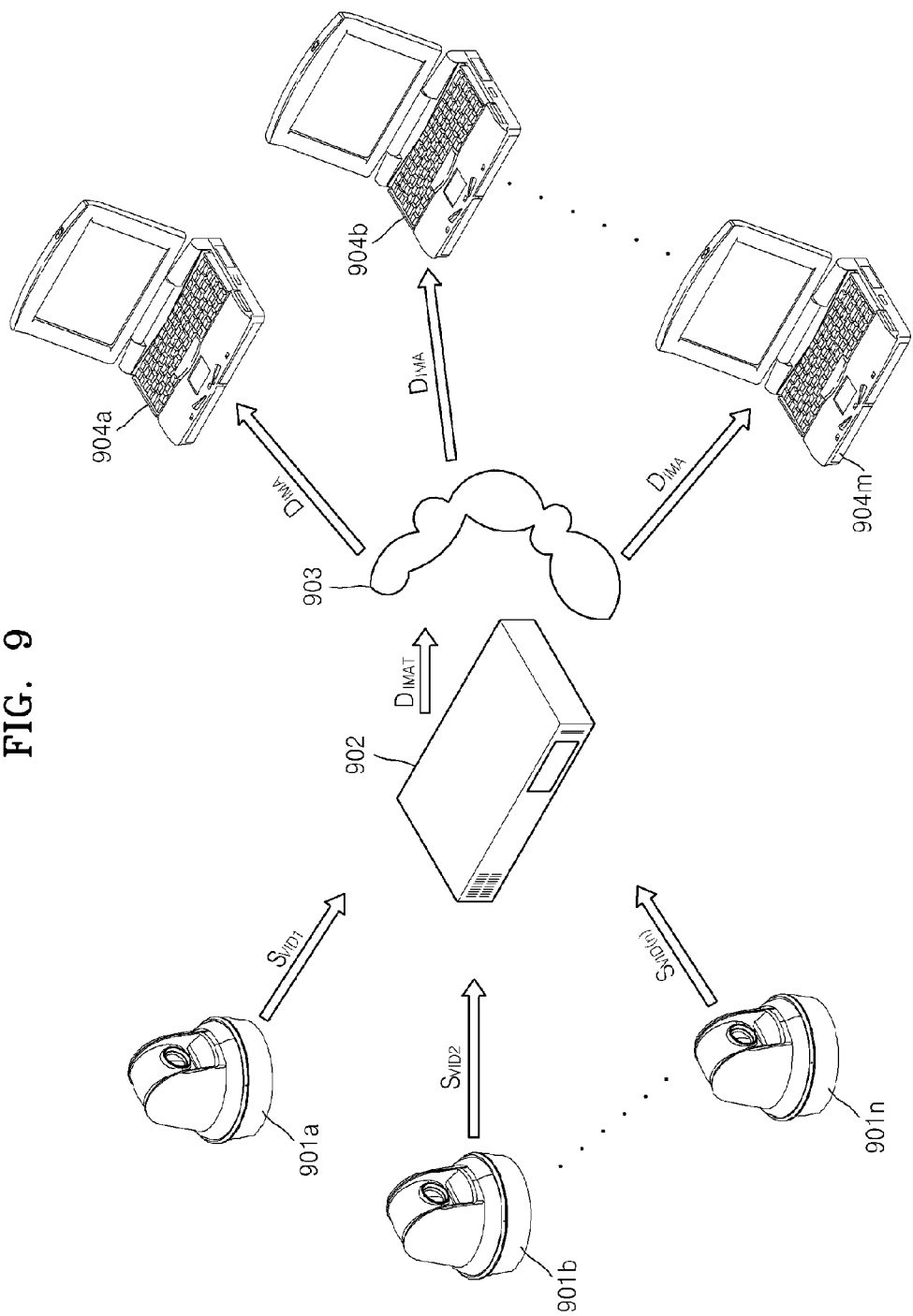
FIG. 9 is a diagram illustrating a surveillance system including a digital video recorder according to another exemplary embodiment of the present invention.

FIG. 9 illustrates a surveillance system including a digital video recorder 902 according to another exemplary embodiment.

Referring to FIG. 9, a plurality of surveillance cameras 901a to 901n respectively transmit analog video signals $S_{VID1}$ to $S_{VID(n)}$ to the digital video recorder 902.

The digital video recorder 902 according to the present embodiment converts the analog video signals $S_{VID1}$ to $S_{VID(n)}$, respectively output from the surveillance cameras 901a to 901n, into digital video data, stores digital video data $D_{IMAT}$ corresponding to the conversion result, and transmits the digital video data $D_{IMAT}$ to a plurality of target devices 904a to 904m over a communication network 903. In the present embodiment, the communication network 903 is the Internet, the target devices 904a to 904m are client terminals. In FIG. 9, reference numeral $D_{IMAT}$ refers to digital video data which is transmitted from the digital video recorder 902 to the communication network 903, and reference numeral $D_{IM4}$ refers to digital video data which is transmitted from the communication network 103 to the client terminals 904a to 904m.

The digital video recorder 902 according to the present embodiment will be described in detail with reference to FIGS. 10 to 14.

Figure 10:
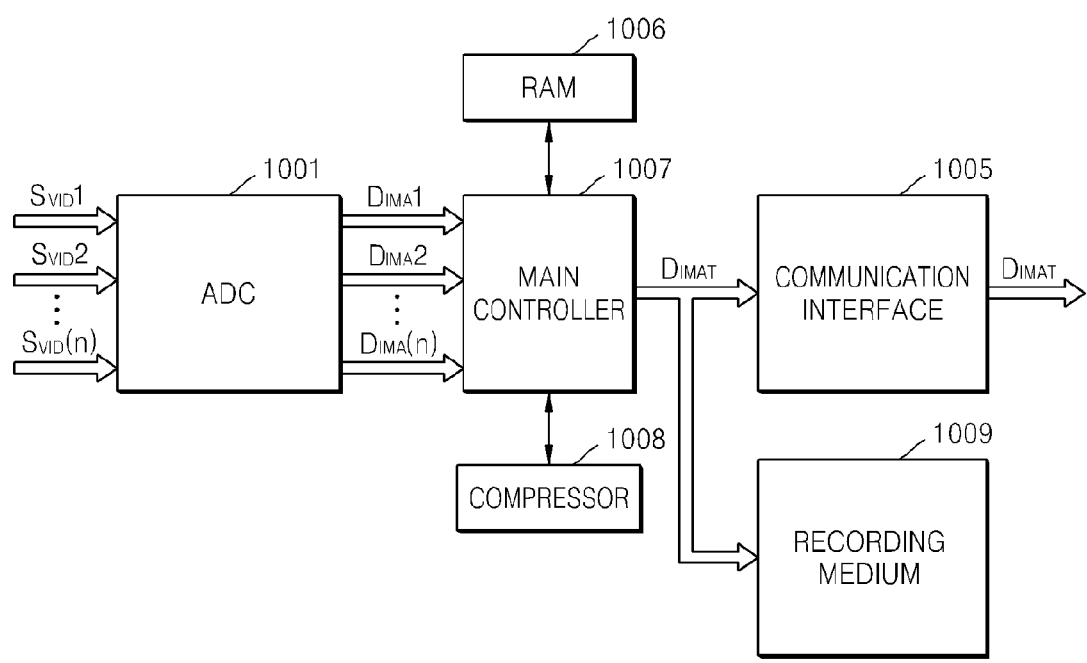
FIG. 10 is a diagram illustrating an internal configuration of the digital video recorder of FIG. 9, according to an exemplary embodiment.

FIG. 10 illustrates an internal configuration of the digital video recorder 902 of FIG. 9. An internal configuration and operation of the digital video recorder 902 according to the present embodiment will now be described in detail with reference to FIGS. 9 and 10.

The digital video recorder 902 according to the present embodiment includes an ADC 1001, a communication interface 1005, a random access memory (RAM) 1006, a main controller 1007, a compressor 1008, and a recording medium 1009. Here, depending on the case, the compressor 1008 may not be provided.

The ADC 1001 converts analog video signals $S_{VID}1$ to $S_{VID}(n)$, respectively output from the surveillance cameras 901a to 901n, into digital video data $D_{IM4}1$ to $D_{IM4}(n)$, respectively.

The main controller 1007 stores data in the RAM 1006, controls the compressor 1008 to compress the digital video data $D_{IM4}1$ to $D_{IM4}(n)$ of respective channels, and stores the digital video data $D_{IMAT}$, corresponding to the compression result, in the recording medium 1009. Also, the main controller 1007 respectively transmits the digital video data $D_{IMAT}$, corresponding to the compression result, to the client terminals 904a to 904m.

Here, the main controller 1007 detects a current motion region (402 in FIG. 4) from the digital video data $D_{IM4}1$ to $D_{IMA}(n)$ transferred from the ADC 201, removes a high frequency component of a region (401 in FIG. 4) except the detected current motion region 402, and transmits the digital video data $D_{IMAT}$ (which corresponds to the removal result) to the client terminals 904a to 904m (which are target devices) through the communication interface 1005 and the communication network 903. In the present embodiment, the main controller 1007 performs the low pass filtering operation on video data of the region 401 except the current motion region 402.

Therefore, the high frequency component of the region 401 except the current motion region 402 is removed by the low pass filtering operation, and thus, the amount of data is reduced in a region unnecessary for surveillance. Accordingly, despite a large amount of data to be transmitted, video data effective for a user is transmitted to the client terminals 904a to 904m which are the target devices.

For example, when digital video data obtained by removing a high frequency component of the region except the current motion region is additionally compressed and transmitted by the compressor 1008, the relatively reduced amount of data is compressed, and thus, even when video data is compressed at a relatively low compression rate, the amount of compressed data may not relatively increase. Also, since a relatively low compression rate is applied, a current motion region necessary for surveillance becomes clearer.

Figure 11:
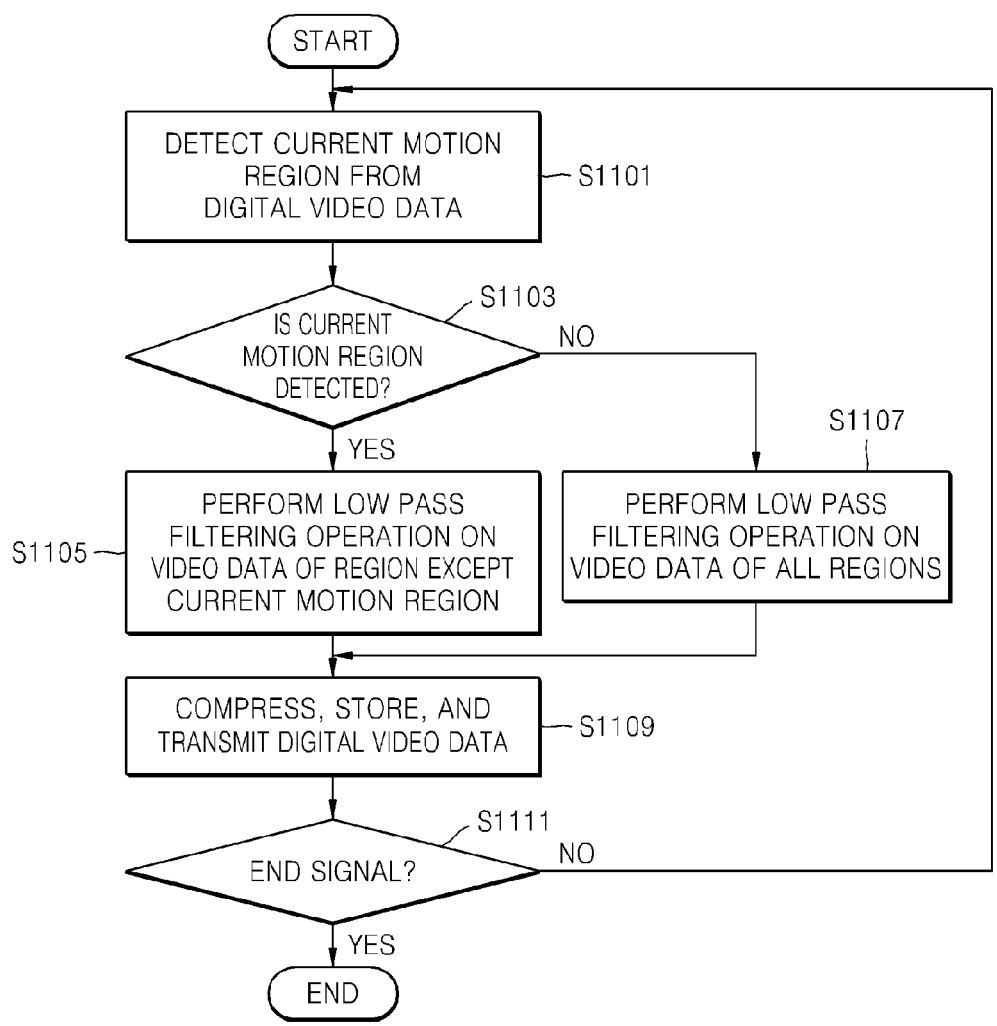
FIG. 11 is a flowchart illustrating an operation of a main controller of FIG. 10, according to an exemplary embodiment.

FIG. 11 illustrates an operation of the main controller 1007 of FIG. 10, according to an exemplary embodiment. Operations of FIG. 11 may be separately performed for each of the digital video data $D_{IMA}1$ to $D_{IMA}(n)$ output from the ADC 1001. This operation of the main controller 1007 will now be described with reference to FIGS. 4, 5, 9, 10 and 11.

In operation S1101, the main controller 1007 detects a current motion region from the digital video data $D_{IMA}1$ to $D_{IMA}(n)$ output from the ADC 1001.

When the current motion region 402 is detected in operation S1103, the main controller 1007 performs the low pass filtering operation on video data of the region 401 except the current motion region 402 to remove the high frequency component therefrom, in operation S1105.

In the present embodiment, the low pass filtering operation denotes an operation in which pixel values of the video data of the region 401 except the current motion region 402 are multiplied by a filter coefficient that is greater than a decimal number 0 and less than a decimal number 1. For example, the 3×3 mask 501 having a filter coefficient of 1/9 is used, and thus, the pixel values of the video data of the region 401 except the current motion region 402 are reduced by 1/9 times.

Here, the filter coefficient increases in proportion to the number of previously-occurred motions in the region 401 except the current motion region 402. For example, when the number of previously-occurred motions in the region 401 except the current motion region 402 is 14, the filter coefficient is 1/9, and when the number of previously-occurred motions in the region 401 except the current motion region 402 is 7, the filter coefficient is 1/18. Therefore, sharpness or resolution may be determined in proportion to an importance of the region 401 except the current motion region 402.

If the current motion region 402 is not detected in operation S1103, the main controller 1007 performs the low pass filtering operation on video data of all the regions 401 and 402 to remove the high frequency component therefrom in operation S1107.

Subsequently, the main controller 1007 compresses digital video data, stores video data $D_{IMAT}$ (corresponding to the compression result) in the recording medium 1009, and transmits the video data $D_{IMAT}$ to the client terminals 904a to 904m through the communication interface 1005, in operation S1109. However, depending on the case, the digital video data may be stored and transmitted without being compressed.

Operations S1101 to S1109 are periodically repeated until the end signal is generated in operation S1111.

Figure 12:
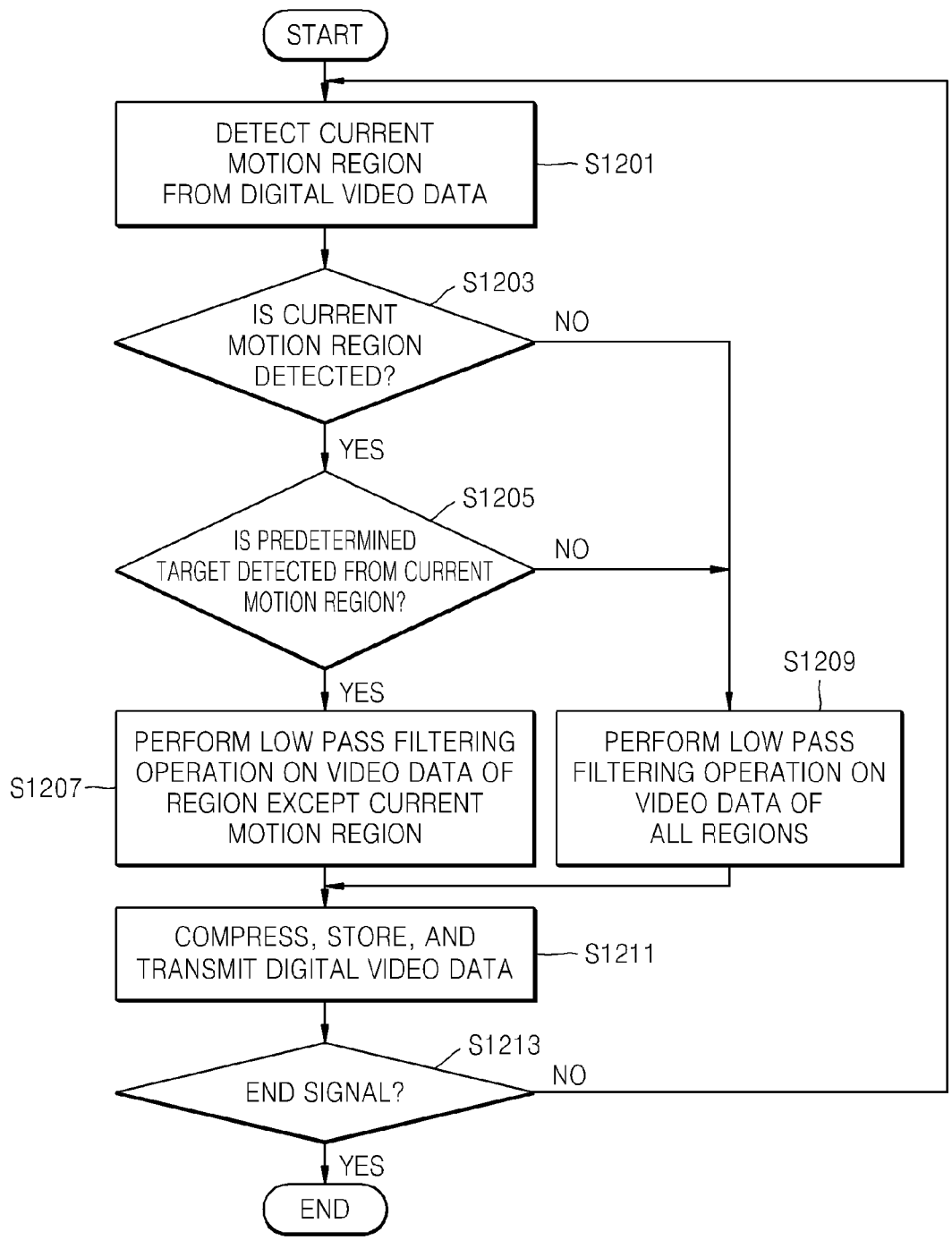
FIG. 12 is a flowchart illustrating an operation of the main controller of FIG. 10, according to an exemplary embodiment.

FIG. 12 illustrates an operation of the main controller 1007 of FIG. 10, according to another exemplary embodiment. Operations of FIG. 12 may be separately performed for each of the digital video data $D_{IMA}1$ to $D_{IMA}(n)$ output from the ADC 1001. This operation of the main controller 1007 will now be described with reference to FIGS. 4, 5, 9, 10 and 12.

In operation S1201, the main controller 1007 detects a current motion region from the digital video data $D_{IMA}1$ to $D_{IMA}(n)$ output from the ADC 1001.

If the current motion region 402 is not detected in operation S1203, the main controller 1007 performs the low pass filtering operation on video data of all the regions 401 and 402 to remove the high frequency component therefrom in operation S1209.

If the current motion region 402 is detected in operation S1203, the main controller 1007 determines whether the predetermined target 402a is detected from the current motion region 402, in operation S1205.

Here, kinds of the predetermined target 402a are various depending on the surveillance purpose of the surveillance system. That is, regarding the advance of motion detection technology including object classification technology, the predetermined target 402a may be a person, an animal, or a vehicle which moves in a specific manner, may be a person or an animal which has a specific shape and color, or may be a specific object.

However, periodically-moving objects (for example, a tree shaken by wind, a rotating electric fan, an ascending/descending elevator, etc.) may be set as a non-moving target.

If the predetermined target 402a is not detected in operation S1205, the main controller 1007 performs the low pass filtering operation on the video data of all the regions 401 and 402 to remove the high frequency component therefrom, in operation S1209.

If the predetermined target 402a is detected in operation S1205, the main controller 1007 performs the low pass filtering operation on the video data of the region 401 except the current motion region 402 to remove the high frequency component in operation S1207.

Subsequently, the main controller 1007 compresses digital video data, stores video data $D_{IMAT}$ (corresponding to the compression result) in the recording medium 1009, and transmits the video data $D_{IMAT}$ to the client terminals 904a to 904m through the communication interface 1005, in operation S1211. However, depending on the case, the digital video data may be stored and transmitted without being compressed.

Operations S1201 to S1211 are periodically repeated until the end signal is generated in operation S1213.

Figure 13:
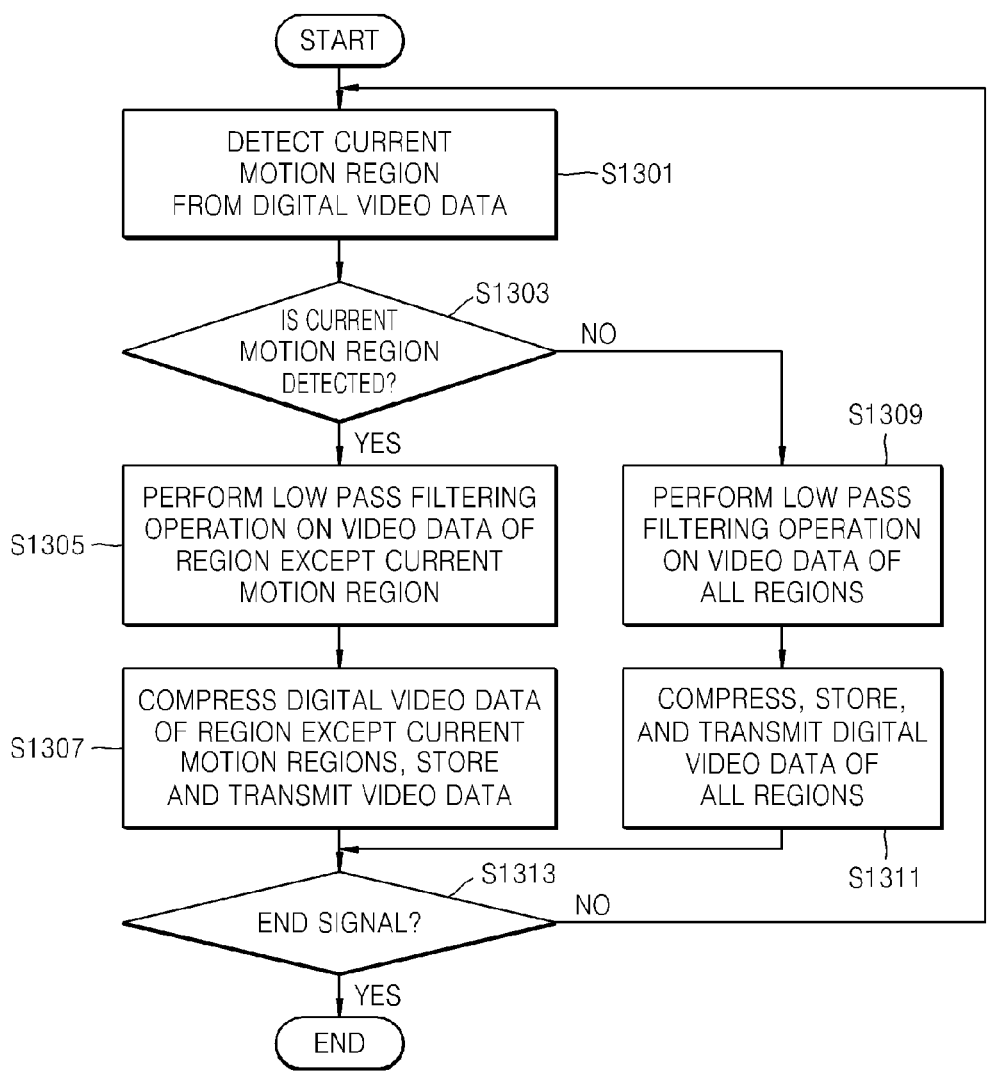
FIG. 13 is a flowchart illustrating an operation of the main controller of FIG. 10, according to an exemplary embodiment.

FIG. 13 illustrates an operation of the main controller 1007 of FIG. 10, according to still another exemplary embodiment. Operations of FIG. 13 may be separately performed for the digital video data $D_{IMA}1$ to $D_{IMA}(n)$ output from the ADC 1001. This operation of the main controller 1007 will now be described with reference to FIGS. 4, 5, 9, 10 and 13.

In operation S1301, the main controller 1007 detects a current motion region from the digital video data $D_{IMA}1$ to $D_{IMA}(n)$ output from the ADC 1001.

If the current motion region 402 is not detected in operation S1303, the main controller 1007 performs the low pass filtering operation on video data of all the regions 401 and 402 to remove the high frequency component therefrom, in operation S1309. Also, the main controller 1007 compresses digital video data of all the regions 401 and 402, stores video data $D_{IMAT}$ (corresponding to the compression result) in the recording medium 1009, and transmits the video data $D_{IMAT}$ to the client terminals 904a to 904m through the communication interface 1005, in operation S1311.

If the current motion region 402 is detected in operation S1303, the main controller 1007 performs the low pass filtering operation on video data of the region 401 except the current motion region 402 to remove the high frequency component therefrom, in operation S1305. Also, the main controller 1007 compresses digital video data of the region 401 except the current motion region 402, stores video data $D_{IMAT}$ (corresponding to the compression result) in the recording medium 1009, and transmits the video data $D_{IMAT}$ to the client terminals 904a to 904m through the communication interface 1005, in operation S1307.

Operations S1301 to S1311 are periodically repeated until the end signal is generated in operation S1313.

Figure 14:
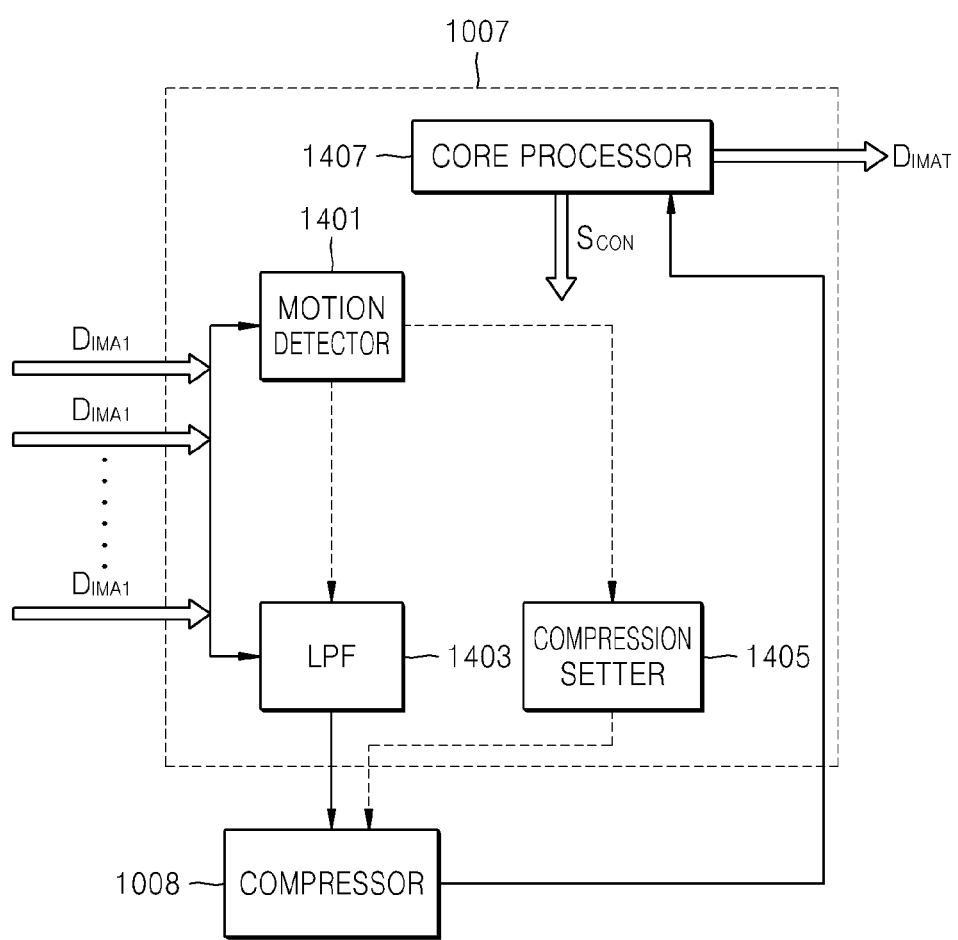
FIG. 14 is a block diagram illustrating an internal configuration of the main controller of FIG. 10, according to an exemplary embodiment.

FIG. 14 illustrates an internal configuration of the main controller 1007 of FIG. 10, according to an exemplary embodiment. The internal configuration of the main controller 1007 will now be described in detail with reference to FIGS. 10 and 14.

The main controller 1007 includes a motion detector 1401, a low pass filter (LPF) 1403, a compression setter 1405, and a core processor 1407.

The motion detector 1401 detects a current motion region from the digital video data $D_{IMA}1$ to $D_{IMA}(n)$ output from the ADC 1001.

The LPF 1403 filters out the high frequency component of a region except a current motion region in the digital video data $D_{IMA}1$ to $D_{IMA}(n)$ output from the ADC 1001, according to information about the current motion region received from the motion detector 1401, and supplies digital video data, corresponding to the removal result, to the compressor 1008 as a compression target.

The compression setter 1405 generates information about a compression exclusion region according to the information about the current motion region from the motion detector 1401, and supplies the information about the compression exclusion region, corresponding to the generation result, to the compressor 1008.

The core processor 1407 controls operations of the motion detector 1401, the LPF 1403, and the compression setter 1405, and outputs the video data $D_{IMAT}$ (corresponding to the compression result), output from the compressor 1008, to the communication interface 1005 and the recording medium 1009.

As described above, according to the above embodiments, in the surveillance camera and the digital video recorder, a current motion region is detected from digital video data, a high frequency component of a region except the detected current motion region is removed, and digital video data corresponding to the removal result is transmitted to a target device over a communication network.

Therefore, the high frequency component of the region except the current motion region is removed by a low pass filtering operation, and thus, the amount of data is reduced in a region unnecessary for surveillance. Accordingly, despite a large amount of data to be transmitted, video data effective for a user is transmitted to a target device.

For example, when digital video data obtained by removing a high frequency component is additionally compressed and transmitted, the relatively reduced amount of data is compressed, and thus, even when video data is compressed at a relatively low compression rate, the amount of compressed data may not relatively increase. Also, since a relatively low compression rate is applied, a current motion region necessary for surveillance becomes clearer.

It should be understood that the above exemplary embodiments should be considered in a descriptive sense only and not for purposes of limitation. Descriptions of features or aspects within each embodiment should typically be considered as available for other similar features or aspects in other exemplary embodiments.

While various exemplary embodiments have been described with reference to the drawings, it will be understood by those of ordinary skill in the art that various changes in form and details may be made therein without departing from the spirit and scope of the inventive concept as defined by the following claims.

What is claimed is:

1. A surveillance apparatus comprising:
an analog-to-digital converter configured to convert an analog video signal, of at least one image of a region captured by an optical system, into digital video data of the region; and
a main controller comprising at least one processor configured to detect a current motion region from the digital video data of the region, remove a high frequency component of the digital video of the region except the current motion region, and transmit the digital video data of the region, from which the high frequency component is removed, to a target device over a communication network,
wherein the main controller is further configured to detect a predetermined target in the current motion region after detecting the current motion region,
wherein if the current motion region is detected from the digital video data of the region, and the predetermined target is detected in the current motion region, the main controller performs low pass filtering on the digital video data of the region except the current motion region, to remove the high frequency component of the digital video of the region except the current motion region,
wherein if the current motion region is detected from the digital video data of the region, and the predetermined target is not detected in the current motion region, the main controller performs low pass filtering on the digital video data of the region including the current motion region, to remove a high frequency component of the digital video data of the region including the current motion region, and
wherein the low-pass filtering is variably determined according to a number of motions previously occurred in the region except the current motion region.

2. The surveillance apparatus of claim 1, wherein the low pass filtering is an operation in which pixel values of the digital video data of the region except the current motion region are multiplied by a filter coefficient, and
wherein the filter coefficient varies according to the number of motions previously occurred in the region except the current motion region so that image resolution or sharpness of the region except the current motion region varies according to the number of motions previously occurred in the region except the current motion region.

3. The surveillance apparatus of claim 1, wherein if the current motion region is not detected from the digital video data of the region, the main controller performs low pass filtering on the digital video data of the region to remove a high frequency component of the digital video data of the region.

4. The surveillance apparatus of claim 1
wherein the low pass filtering is an operation in which pixel values of the digital video data of the region except the current motion region are multiplied by a filter coefficient, and
wherein the filter coefficient is variably determined according to the number of motions previously occurred in the region except the current motion region.

5. The surveillance apparatus of claim 4, wherein the filter coefficient is proportional to the number of motions previously occurred in the region except the current motion region.

6. The surveillance apparatus of claim 1, wherein the main controller is further configured to compress the digital video data of the region.

7. The surveillance apparatus of claim 1, wherein if the current motion region is detected from the digital video data of the region, the main controller compresses the digital video data on which the low pass filtering is performed without compressing the digital video data on which the low pass filtering is not performed.

8. The surveillance apparatus of claim 1, wherein the surveillance apparatus is a camera comprising the optical system.

9. The surveillance apparatus of claim 1, wherein the apparatus is a digital video recorder configured to receive the analog video signal from at least one camera.

10. A method of processing video data:
converting an analog video signal, of at least one image of a region captured by an optical system, into digital video data of the region;
detecting a current motion region from the digital video data of the region;
removing a high frequency component of the digital video of the region except the current motion region if the current motion region is detected; and
transmitting the digital video data, from which the high frequency component is removed, to a target device over a communication network,
wherein the method further comprises:
detecting a predetermined target in the current motion region after detecting the current motion region;
if the current motion region is detected in the digital video data of the region, and the predetermined target is detected from the current motion region, performing low pass filtering on the digital video data of the region except the current motion region, to remove the high frequency component of the digital video of the region except the current motion region; and
if the current motion region is detected from the digital video data of the region, and the predetermined target is not detected in the current motion region, performing low pass filtering on the digital video data of the region including the current motion region, to remove a high frequency component of the digital video data of the region including the current motion region, and
wherein the low-pass filtering is variably determined according to a number of motions previously occurred in the region except the current motion region.

11. The method of claim 10, wherein the low pass filtering is an operation in which pixel values of the digital video data of the region except the current motion region are multiplied by a filter coefficient, and
wherein the filter coefficient varies according to a number of motions previously occurred in the region except the current motion region so that image resolution or sharpness of the region except the current motion region varies according to the number of motions previously occurred in the region except the current motion region.

12. The method of claim 10, further comprising low pass filtering on the digital video data of the region to remove a high frequency component of the digital video data of the region, if the current motion region is not detected from the digital video data of the region.

13. The method of claim 10, wherein the low pass filtering is an operation in which pixel values of the digital video data of the region except the current motion region are multiplied by a filter coefficient.

14. The method of claim 13, wherein the filter coefficient is variably determined according to the number of motions previously occurred in the region except the current motion region.

15. The method of claim 10, further comprising compressing the digital video data of the region.

16. The method of claim,10 further comprising, if the current motion region is detected from the digital video data of the region, compressing the digital video data on which the low pass filtering is performed without compressing the digital video data on which the low pass filtering is not performed.

17. A non-transitory computer recording medium having recorded thereon a program for executing the method of claim 10.

18. The surveillance apparatus of claim 1, wherein the low pass filtering is an operation in which pixel values of the digital video data of the region except the current motion region are multiplied by a filter coefficient, and
wherein the filter coefficient is variably determined according to the number of motions previously occurred in the region except the current motion region.

19. The surveillance apparatus of claim 18, wherein the filter coefficient is proportional to the number of motions previously occurred in the region except the current motion region.

20. The method of claim 14, wherein the filter coefficient is proportional to the number of motions previously occurred in the region except the current motion region.

* * * * *